US012725935B2

(12) United States Patent
Ozaki et al.

(10) Patent No.: US 12,725,935 B2
(45) Date of Patent: Sep. 1, 2026

(54) ARRAY ANTENNA MODULE

(71) Applicant: 1FINITY Inc., Kawasaki (JP)

(72) Inventors: Shirou Ozaki, Yamato (JP); Naoya Okamoto, Isehara (JP); Yasuhiro Nakasha, Hadano (JP); Naoki Hara, Sagamihara (JP)

(73) Assignee: 1FINITY Inc., Kawasaki (JP)

( * ) Notice: Subject to any disclaimer, the term of this patent is extended or adjusted under 35 U.S.C. 154(b) by 18 days.

(21) Appl. No.: 19/058,790

(22) Filed: Feb. 20, 2025

(65) Prior Publication Data

US 2025/0300364 A1 Sep. 25, 2025

(30) Foreign Application Priority Data

Mar. 25, 2024 (JP) ................................. 2024-047675

(51) Int. Cl.
*H01Q 1/02* (2006.01)
*H01Q 21/00* (2006.01)
*H01Q 21/06* (2006.01)

(52) U.S. Cl.
CPC ............. *H01Q 21/062* (2013.01); *H01Q 1/02* (2013.01); *H01Q 21/0006* (2013.01)

(58) Field of Classification Search
CPC .. H01Q 1/02; H01Q 1/38; H01Q 1/48; H01Q 1/52; H01Q 21/00; H01Q 21/0006; H01Q 21/0025; H01Q 21/06; H01Q 21/062; H01Q 21/24
See application file for complete search history.

(56) References Cited

U.S. PATENT DOCUMENTS

| | | | | |
|---|---|---|---|---|
| 11,201,397 | B2 * | 12/2021 | Kaho | H01P 3/081 |
| 11,217,877 | B2 * | 1/2022 | Islam | H01Q 1/02 |
| 11,417,940 | B2 * | 8/2022 | Hasegawa | H01Q 1/02 |
| 12,531,323 | B2 * | 1/2026 | Kim | H01Q 1/02 |
| 2023/0246346 | A1 | 8/2023 | Watanabe et al. | |

FOREIGN PATENT DOCUMENTS

| | | |
|---|---|---|
| JP | 2009-200719 A | 9/2009 |
| WO | WO 2022/124168 A1 | 6/2022 |

* cited by examiner

*Primary Examiner* — Tho G Phan
(74) *Attorney, Agent, or Firm* — ArentFox Schiff LLP

(57) ABSTRACT

An array antenna module includes a housing including heat sinks, and a holder configured to hold the heat sinks, substrates provided between the heat sinks, where each substrate has an edge, antennas configuring an array antenna, where at least one antenna is provided on each substrate and the antennas are arranged at positions where radio waves are radiated from edges of the substrates toward an outer side of the substrates, and amplifiers provided on each substrate and electrically connected to the antennas. Each amplifier has a first surface provided on one substrate and a second surface opposite to the first surface and connected to one heat sink.

9 Claims, 3 Drawing Sheets

ARRAY ANTENNA MODULE

CROSS-REFERENCE TO RELATED APPLICATIONS

This application is based upon and claims the benefit of priority of the prior Japanese Patent Application No. 2024-047675, filed on Mar. 25, 2024, the entire contents of which are incorporated herein by reference.

FIELD

The embodiments discussed herein are related to array antenna modules.

BACKGROUND

A proposed planar microwave antenna has a dipole, and a feed line for feeding power to the dipole, which are printed on both surfaces of a dielectric substrate. A director spaced apart from the dipole is printed on at least one of the surfaces of the substrate, and a reflector is provided on the one surface of the substrate. A planar Yagi-Uda antenna is composed of the director, the reflector, and the dipole. A tapered balun connected to the feed line on the other surface of the substrate, and a ground conductor connected to the tapered balun, are printed on the other surface of the substrate. A plurality of such planar microwave antennas are arranged in parallel on a common substrate to construct a one-dimensional microwave antenna. A plurality of such one-dimensional microwave antennas are arranged to overlap one another to construct a two-dimensional microwave antenna array (refer to Japanese Laid-Open Patent Publication No. 2009-200719, for example).

Conventional two-dimensional microwave antenna arrays (or array antenna modules) do not have a heat dissipation structure. For example, when transmitting radio waves in the millimeter wave band of the fifth generation mobile communication system (5G), the sixth generation mobile communication system (6G), or the like, radio waves in a frequency band of 100 GHz or higher may be transmitted. The radio waves are amplified by an amplifier in order to extend the communication range. However, because the amplifier generates heat, a heat dissipation structure is desired.

SUMMARY

Accordingly, it is one object in one aspect of the embodiments to provide an array antenna module having a heat dissipation structure capable of dissipating heat generated by an amplifier.

According to one aspect of the embodiments, an array antenna module includes a housing including a plurality of layers of heat sinks, and a holder configured to hold the plurality of layers of heat sinks; a plurality of substrates provided between the plurality of layers of heat sinks, each substrate of the plurality of substrates having an edge; a plurality of antennas configuring an array antenna, at least one antenna of the plurality of antennas being provided on each substrate of the plurality of substrates, the plurality of antennas being arranged at positions where radio waves are radiated from a plurality of edges of the plurality of substrates toward an outer side of the plurality of substrates; and a plurality of amplifiers provided on each substrate of the plurality of substrates and electrically connected to the plurality of antennas, each amplifier of the plurality of amplifiers having a first surface provided on one substrate of the plurality of substrates and a second surface opposite to the first surface and connected to one layer of heat sink of the plurality of layers of heat sinks.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
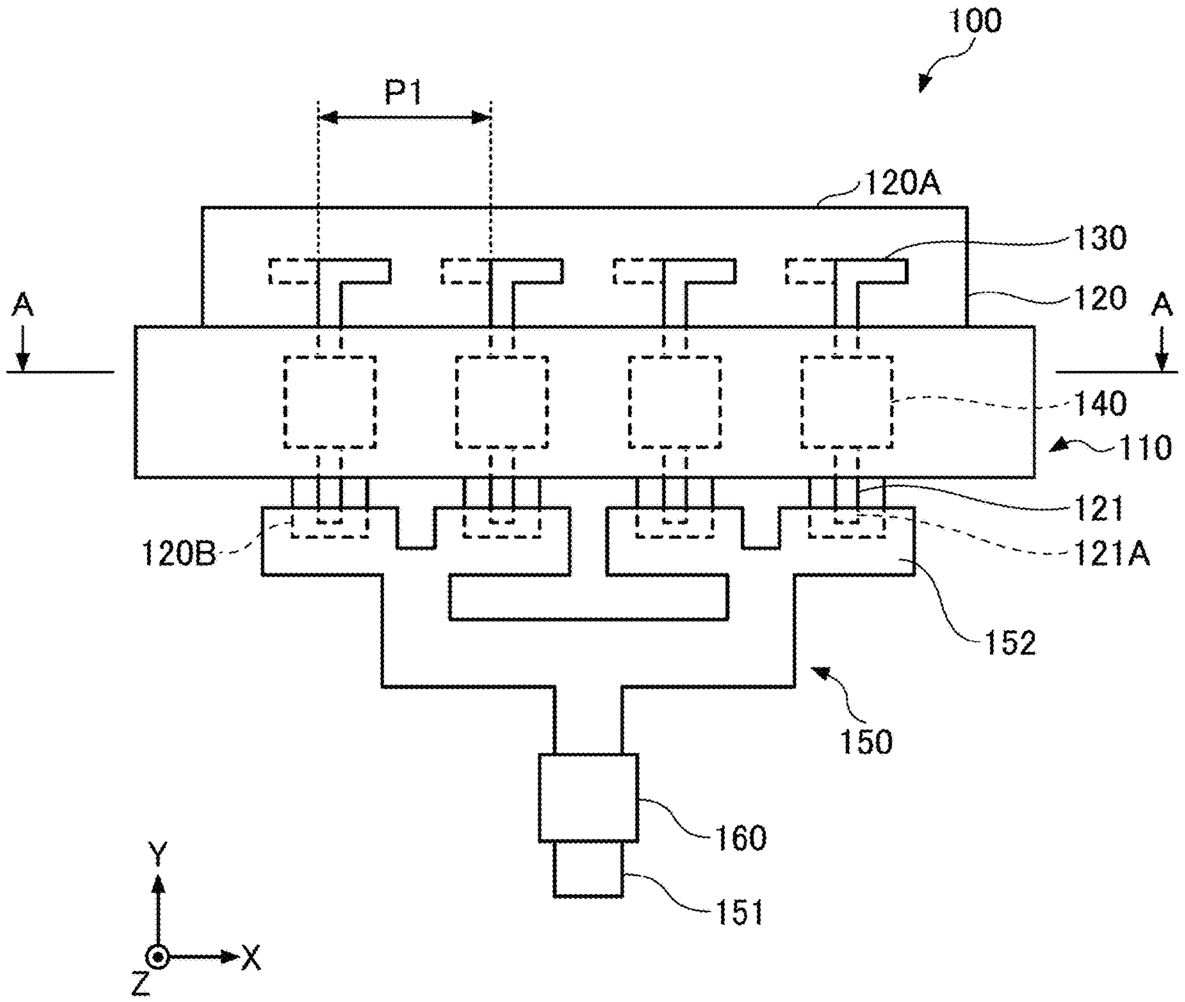
FIG. 1 is a diagram illustrating an example of a planar configuration of an array antenna module according to an embodiment.

Preferred embodiments to which an array antenna module according to the present disclosure may be applied, will be described with reference to the drawings.

Hereinafter, embodiments applied with the array antenna module according to the present disclosure will be described. In the following description, the same constituent elements are designated by the same reference numerals, and a redundant description thereof may be omitted.

In the following, an XYZ coordinate system will be defined and described. A direction parallel to an X-axis (X-direction), a direction parallel to a Y-axis (Y-direction), and a direction parallel to a Z-axis (Z-direction) are orthogonal to one another. The X-direction is an example of a first axis direction, the Y-direction is an example of a second axis direction, and the Z-direction is an example of a third axis direction. For sake of convenience in the following description, the −Z-direction side may be referred to as a lower side or a bottom side, and the +Z-direction side may be referred to as an upper side or a top side. Further, a plan view refers to a view from above in a direction perpendicular to an XY-plane. In the following description, a length, a diameter, a thickness, or the like of each constituent element may be exaggerated to facilitate understanding of a configuration thereof. In addition, the terms “parallel”, “perpendicular”, “orthogonal”, “horizontal”, “vertical”, “upper”, “lower”, or the like may include a deviation to such an extent that advantageous features or effects of the embodiments will not be impaired.

Radio waves transmitted or received by antennas of the array antenna module according to the embodiments are assumed to be radio waves of 300 GHz, for example, among radio waves (terahertz waves) in frequency bands of 100 GHz or higher that may be used in the sixth generation mobile communication system (6G) or the like. A wavelength of the radio waves of 300 GHz in free space is approximately 1 mm. However, the radio waves transmitted or received by the antennas of the array antenna module according to the embodiments may be radio waves in the millimeter wave band of the fifth generation mobile communication system (5G) or the like, or radio waves in a frequency band of 1 GHZ to 30 GHz, including Sub-6 (that is, a range of frequencies used in 5G networks that are below 6 GHz).

Embodiment

Figure 2:
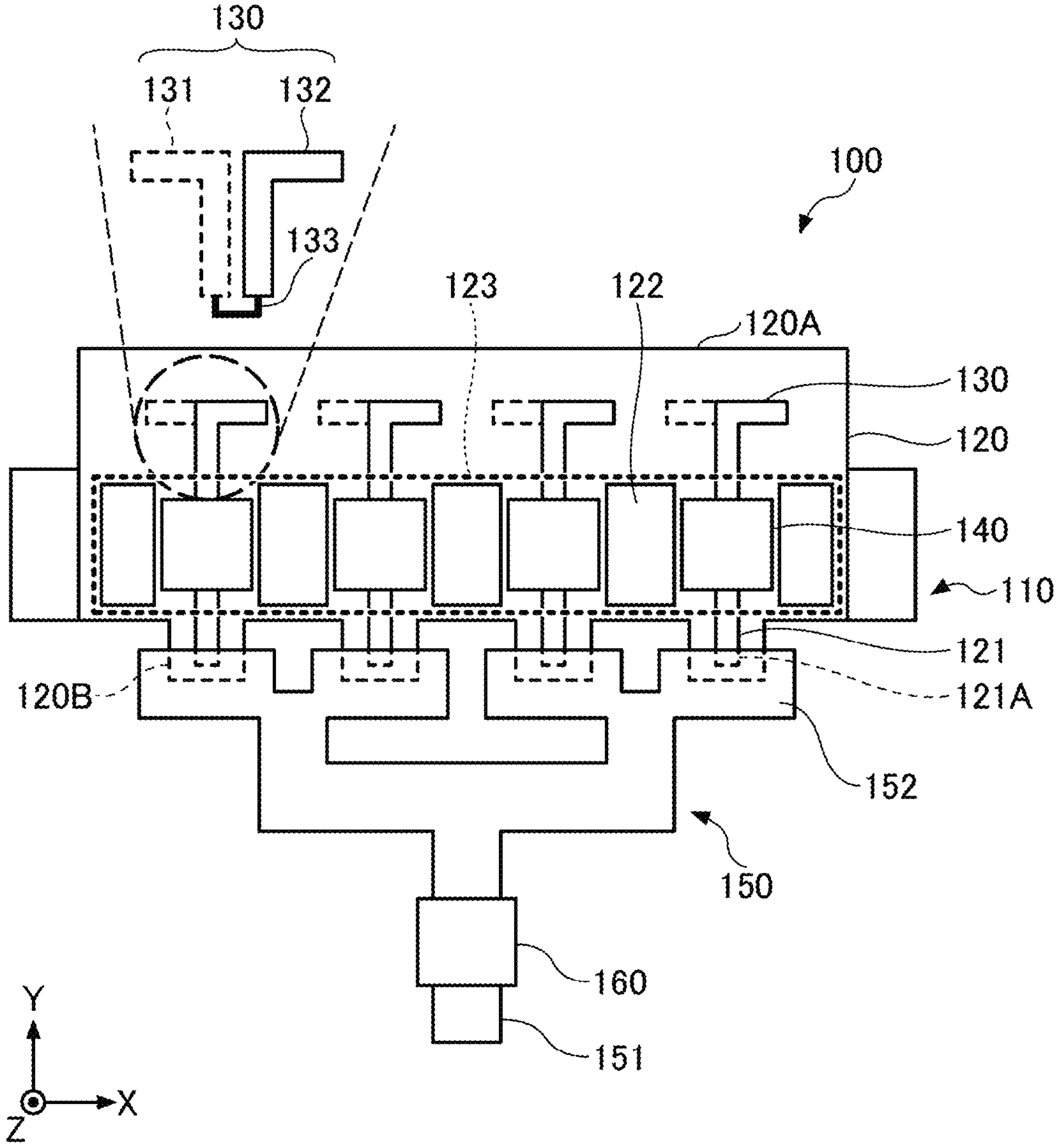
FIG. 2 is a diagram illustrating an example of a planar configuration (a planar configuration of a view in a direction of arrows B-B in FIG. 3) of the array antenna module illustrated in FIG. 1, with some of constituent elements thereof omitted.
Figure 3:
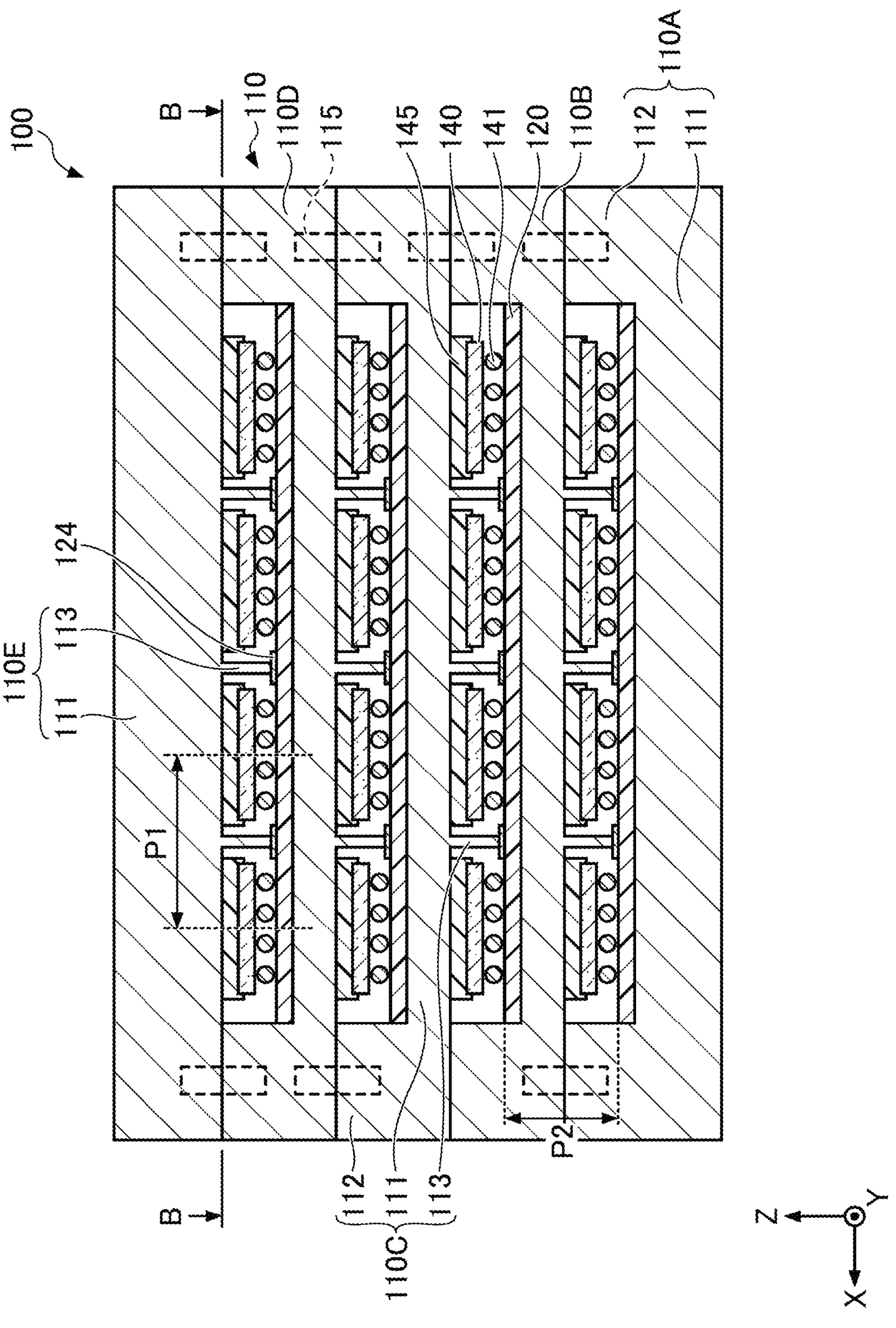
FIG. 3 is a diagram illustrating an example of a configuration of a cross section taken along a line A-A in FIG. 1.

FIG. 1 is a diagram illustrating an example of a planar configuration of an array antenna module 100 according to an embodiment. FIG. 2 is a diagram illustrating an example of a planar configuration of the array antenna module 100 illustrated in FIG. 1 in a state where some of constituent elements thereof are omitted. FIG. 3 is a diagram illustrating an example of a configuration of a cross section taken along a line A-A in FIG. 1. FIG. 2 illustrates a view of the planar configuration in a direction of arrows B-B in FIG. 3.

<Configuration of Array Antenna Module 100>

The array antenna module 100 includes a housing 110, a plurality of substrates 120, a plurality of antennas 130, a plurality of power amplifiers (PAs) 140, a plurality of adhesive layers 145, a plurality of waveguides 150, and a plurality of phase shifters 160. The PA 140 is an example of an amplifier.

As illustrated in FIG. 3 as an example, the array antenna module 100 has a laminated structure in which five housing pieces 110A through 110E of the housing 110 and four substrates 120 are alternately laminated in the Z-direction. In addition, four waveguides 150 are provided in correspondence with the four substrates 120, such that one waveguide 150 is provided with respect to each substrate 120. Further, as an example, one phase shifter 160 is provided with respect to one waveguide 150.

For this reason, the array antenna module 100 having the configuration illustrated in FIG. 3 includes four waveguides 150 and four phase shifters 160. The four waveguides 150 are arranged in the Z-direction on the −Y-direction side of the housing 110 in FIG. 3, similar to the four substrates 120 arranged in the Z-direction illustrated in FIG. 3. The positions of the four waveguides 150 in the Z-direction are the same as the positions of the four substrates 120 in the Z-direction, respectively. The four waveguides 150 are arranged in four stages in the Z-direction, and are fixed to the housing 110 or the like by a fastener (not illustrated) or the like.

In FIG. 1, some constituent elements (a portion of interconnects 121, a portion of the plurality of antennas 130, and the plurality of PAs 140) covered with the housing 110 are indicated by dashed lines. The constituent elements indicated by the dashed lines inside the housing 110 in FIG. 1 are the constituent elements provided on the uppermost substrate 120, and include the portion of the interconnects 121, the portion of the plurality of antennas 130, and the plurality of PAs 140. FIG. 2 illustrates the uppermost substrate 120, the antennas 130 and the PAs 140 provided on the uppermost substrate 120, the uppermost waveguide 150 connected to the interconnect 121 on the uppermost substrate 120, and the phase shifter 160 provided on the uppermost waveguide 150. In FIG. 2, one antenna 130 surrounded by a dashed circle is illustrated on an enlarged scale for the sake of convenience.

In FIG. 1 and FIG. 2, constituent elements (end portions of protruding portions 120B of the substrate 120 on the −Y-direction side, and end portions 121A of the interconnects 121 on the −Y-direction side) entering inside the waveguide 150 are transparently indicated by dashed lines.

<Housing 110>

As illustrated in FIG. 1, the housing 110 is located at a center of the array antenna module 100 in the plan view, and has a rectangular shape having a longitudinal direction along the X-direction and a short direction along the Y-direction in the plan view. A portion (a portion where the antenna 130 is arranged) of the substrate 120 on the side having an edge 120A (+Y-direction side), and the protruding portion 120B of the substrate 120 where a portion of the interconnect 121 on the side having the end portion 121A is arranged, are located outside the housing 110 in the plan view.

As illustrated in FIG. 3, the housing 110 includes a plurality of layers of heat sinks (or heat dissipation plates) 111, a plurality of walls 112, a plurality of partition walls 113, and a plurality of fasteners 115. The wall 112 is an example of a holding portion. The housing 110 can be separated into five layers of housing pieces 110A through 110E, and the housing pieces 110A through 110E are fixed by the plurality of fasteners 115 in a state where the housing pieces 110A through 110E are laminated in this order in the Z-direction. The housing piece 110A is located at a lowermost layer (or a first layer), and the housing piece 110E is located at an uppermost layer (or a fourth layer). Each of the housing pieces 110A through 110D located at the first through fourth layers holds four substrates 120. That is, the housing 110 holds four substrates 120.

As illustrated in FIG. 3, the housing 110 includes five layers of heat sinks 111, and four layers of substrates 120, for example. Hereinafter, the heat sinks 111 located at a lowermost layer through an uppermost layer are referred to as being located at first through fifth layers. The substrates 120 located at a lowermost layer through an uppermost layer are referred to as being located at first through fourth layers. A configuration in which four layers of substrates 120 are provided will be described as an example. However, the number of layers of the substrates 120 may be two or more, and laminating two or more layers of substrates with the use of the housing 110 will be referred to as a multi-tier integration. The waveguides 150 located at a lowermost layer through an uppermost layer are referred to as being located at first through fourth stages.

The housing 110 is formed of aluminum, for example, and has a surface plated with gold. The housing 110 may be formed of a metal other than aluminum. Copper is an example of the metal other than aluminum.

The housing 110 may be formed of any one of silicon carbide (SiC), silicon nitride (SiN), aluminum nitride (AlN), and silicon (Si), for example. In addition, the housing 110 may have a laminated structure in which a plurality of layers formed of a plurality of materials selected from silicon carbide (SiC), silicon nitride (SiN), aluminum nitride (AlN), silicon (Si), and metals are laminated.

The housing piece 110A includes the heat sink 111 of the first layer, and the walls 112 extending above the heat sink 111 of the first layer. The housing pieces 110B through 110D are located at the second through fourth layers, and have the same configuration. The housing pieces 110B through 110D include the heat sinks 111 of the second through fourth layers, the walls 112 extending above the heat sinks 111 of the second through fourth layers, and the partition walls 113 extending downward from lower surfaces of the heat sinks 111 of the second through fourth layers, respectively. The housing piece 110E includes the heat sink 111 of the fifth layer, and the partition wall 113 extending downward from a lower surface of the heat sink 111 of the fifth layer.

The housing piece 110A is integrally formed and integrally includes the heat sink 111 of the first layer, and the walls 112 extending on an upper side of the heat sink 111 of the first layer. The same holds true for the housing pieces 110B through 110E.

The housing piece 110A may have a configuration in which the heat sink 111 and the walls 112 are formed of separate members which are joined or connected by bonding, welding, or the like. Alternatively, the housing piece 110A may have a configuration in which the heat sink 111 and the walls 112 are fixed by a fixing member. The housing pieces 110B through 110D may be configured such that the heat sinks 111, the walls 112, and the partition walls 113 are formed of separate members, and are joined or connected by the fixing members or the like. The housing piece 110E may have a configuration in which the heat sinks 111 and the partition walls 113 are formed of separate members, and are joined or connected by the fixing member or the like.

<Heat Sink 111>

The heat sink 111 is a plate shaped member extending parallel to the XY-plane. Lengths of the heat sink 111 in the X-direction and the Y-direction in the plan view are the same as lengths of the housing 110 in the X-direction and the Y-direction in the plan view, respectively. That is, the heat sink 111 extends over the entire housing 110 in the plan view.

In FIG. 3, the heat sinks 111 of the first and fifth layers are thicker than the heat sinks 111 of the second through fourth layers, for example. However, thicknesses of the five heat sinks 111 may be set to appropriate thicknesses according to heat generation characteristics of the PAs 140 or the like.

The walls 112 are provided at an end on the +Y-direction side and an end on the −Y-direction side of the upper surfaces of the heat sinks 111 of the first through fourth layers. The wall 112 is not provided at an end on the +X-direction side and an end on the −X-direction side of the upper surfaces of the heat sinks 111 of the first through fourth layers. For this reason, the housing pieces 110A through 110D have a U-shape in a view perpendicular to the XZ-plane. In other words, the housing pieces 110A through 110D have a concave shape in which a portion between the wall 112 on the +Y-direction side and the wall 112 on the −Y-direction side is recessed downward in the view perpendicular to the XZ-plane. The walls 112 are not provided on the heat sink 111 of the fifth layer.

The substrates 120 of the first through fourth layers are provided on the upper surfaces of the heat sinks 111 of the first through fourth layers, respectively. The substrate 120 is fixed to the heat sink 111 using a conductive adhesive or the like, such as silver paste or the like. That is, the substrates 120 of the first through fourth layers are provided in concave portions between the walls 112 on the +Y-direction side and the walls 112 on the −Y-direction side in the upper surfaces of the housing pieces 110A through 110D, respectively.

<Wall 112>

The walls 112 are provided at the end on the +Y-direction side and the end on the −Y-direction side of the upper surfaces of the heat sinks 111 of the first through fourth layers, and extend from the end on the −Y-direction side to the end on the +Y-direction side of the heat sinks 111 in parallel to the YZ-plane. The walls 112 are provided to hold the heat sinks 111 of the five layers.

<Partition Wall 113>

The partition walls 113 are thin plate shaped walls extending downward from the lower surfaces of the heat sinks 111 of the second through fifth layers, and extending in parallel to the YZ-plane. The partition walls 113 extend from the end on the −Y-direction side to the end on the +Y-direction side of the heat sinks 111. A lower end of each partition wall 113 makes contact with an upper surface of a metal layer 124.

Three partition walls 113 are provided at equal intervals in the X-direction on the lower surface of each of the heat sinks 111 of the second through fifth layers. The partition wall 113 partitions the PAs 140 that are adjacent to each other in the X-direction, and is provided to secure isolation between the adjacent PAs 140. A thickness of the partition wall 113 may be set to ensure a sufficient isolation between the adjacent PAs 140.

<Fastener 115>

The fastener 115 may be any member capable of fixing the housing pieces 110A through 110E together. The fastener 115 may be a member capable of fixing two housing pieces adjacent to each other in the Z-direction, among the housing pieces 110A through 110E, by screws, fitting, or the like.

<Substrate 120>

As illustrated in FIG. 2, the substrate 120 has a rectangular parallelepiped shape in the plan view. The substrate 120 includes the edge 120A extending in the X-direction at the end on the +Y-direction side of the rectangular parallelepiped shape, and four protruding portions 120B protruding in the −Y-direction from the end on the −Y-direction side of the rectangular parallelepiped shape. The substrate 120 includes four interconnects 121, five ground layers 122, a ground layer 123, and a plurality of metal layers 124. As an example, a wiring board in conformance with a standard, such as FR-4 (flame retardant type 4) or the like, can be used for the substrate 120.

Although the substrate 120 of the fourth layer is illustrated in FIG. 2, the substrates 120 of the first through third layers have the same configuration as the substrate 120 of the fourth layer. Thus, the configuration of the substrate 120 of the fourth layer will be described hereinafter. The waveguide 150 illustrated in FIG. 2 is the waveguide 150 of the fourth stage. The waveguides 150 of the first through third stages have the same configuration as the waveguide 150 of the fourth stage.

Four antennas 130 and four PAs 140 are provided on the substrate 120. The four antennas 130 are arranged at equal intervals in the X-direction along the edge 120A in a region (or an area) that is approximately one-half the area of the entire substrate 120 and is located on the +Y-direction side in the plan view.

Positions of the four antennas 130 and the four PAs 140 in the X-direction correspond to positions of the four protruding portions 120B in the X-direction, respectively. The four protruding portions 120B are provided at equal intervals in the X-direction, the four antennas 130 are arranged at equal intervals in the X-direction, and the four PAS 140 are arranged at equal intervals in the X-direction. The four antennas 130 are connected to the four PAs 140, respectively. The PAs 140 are connected to terminals or the like on the upper surface of the substrate 120 via a ball grid array (BGA) 141. The BGA 141 is implemented by gold bumps, for example. The PAs 140 are flip-chip bonded on the substrate 120 using the BGA 141.

<Interconnect 121>

The four interconnects 121 are provided on the upper surface of the substrate 120, and extend in the Y-direction toward the end portions of the protruding portions 120B on the −Y-direction side, on the −Y-direction side of the four PAs 140. Each interconnect 121 may be formed of a metal, and can be manufactured by patterning a copper foil, for example.

The end portion of each interconnect 121 on the +Y-direction side is connected to the PA 140, and the end portion 121A of each interconnect 121 on the −Y-direction side extends to a position up to just before the end portion of the protruding portion 120B on the −Y-direction side. The end portion 121A and the end portion of the protruding portion 120B on the −Y-direction side are inserted into an end portion 152 of the waveguide 150 on the +Y-direction side.

The end portion 152 of the waveguide 150 on the +Y-direction side has a waveguide through which radio waves propagate in the X-direction, and an opening provided in a side surface parallel to the XZ-plane on the −Y-direction side. The end portion 121A of the interconnect 121, and the end portion of the protruding portion 120B on the −Y-direction side, are insertable into the opening in the side surface of the end portion 152. The opening is parallel to the XZ-plane.

The end portion 121A is inserted into the waveguide 150 via the opening in the end portion 152 on the +Y-direction side of the waveguide 150. The end portion 152 of the waveguide 150 on the +Y-direction side and the end portion 121A of the interconnect 121 are configured to perform a conversion between the radio waves propagating inside the waveguide 150 and an electric signal propagating through the interconnect 121.

<Ground Layer 122>

The five ground layers 122 are provided in a region of the upper surface of the substrate 120 overlapping the housing 110 in the plan view, so as to sandwich the four PAs 140 in the X-direction. In other words, the five ground layers 122 are provided such that each PA 140 is sandwiched between two adjacent ground layers 122 in the X-direction, in a region overlapping the ground layer 123 in the plan view. The ground layers 122 are connected to ground terminals of the PAs 140, respectively. The ground layers 122 may be formed of a metal, and can be formed by patterning a copper foil, for example.

<Ground Layer 123>

The ground layer 123 is a rectangular metal layer provided on the lower surface of the substrate 120 in a portion where the substrate 120 overlaps the housing 110 in the plan view. The ground layer 123 is connected to the ground terminals of the PAs 140. The ground layer 123 may be formed of a metal, and can be formed by patterning a copper foil, for example. The ground layer 123 is formed in a region where the five ground layers 122 and the four PAs 140 are formed in the plan view.

<Metal Layer 124>

The metal layer 124 is provided on a portion of the upper surface of the substrate 120 where the partition wall 113 is located in the plan view. The metal layer 124 has a width in the X-direction that is greater than or equal to a width of the partition wall 113 in the X-direction. The metal layer 124 has a length in the Y-direction that is the same as a length of the partition wall 113 in the Y-direction. The lower end of the partition wall 113 makes contact with an upper surface of the metal layer 124.

The metal layer 124 may be formed of a metal, and can be formed by patterning a copper foil, for example. In a case where the lower end of the partition wall 113 makes contact with the upper surface of the metal layer 124, the isolation between the adjacent PAs 140 can be made even stronger. On the other hand, in a case where a sufficient isolation between the adjacent PAs 140 can be ensured without providing the metal layer 124, the metal layer 124 on the substrate 120 may be omitted.

<Antenna 130>

The four antennas 130 are provided on the substrate 120. The antenna 130 has a T-shape in the plan view. The four antennas 130 are arranged at equal intervals in the X-direction on the +Y-direction side of the four PAs 140 in the plan view. The four antennas 130 are arranged along the edge 120A. The four antennas 130 are arranged at positions where radio waves can be radiated toward the outside (toward the +Y-direction) of each of the four substrates 120 from each of the four edges 120A thereof.

The end portion of each antenna 130 on the −Y-direction side connected to the PA 140 overlaps the housing 110 in the plan view, as illustrated in FIG. 1. Portions of each antenna 130 other than the end portion on the −Y-direction side connected to the PA 140 do not overlap the housing 110 in the plan view, and are located outside the housing 110, in order to prevent the housing 110 from blocking radiation of each antenna 130.

The four antennas 130 being arranged at the positions where radio waves can be radiated toward the outside (toward the +Y-direction) of each of the four substrates 120 from each of the four edges 120A thereof refers to a state in which a portion (a tip end of the T-shape) where radiation of each antenna 130 is mainly performed is located near the edge 120A and does not overlap the housing 110 in the plan view. The portion (the tip end of the T-shape) where the radiation of the antenna 130 is mainly performed being near the edge 120A refers to a state in which a length of a portion of the substrate 120 closer to the edge 120A than the antenna 130 (the tip end of the T-shape) is to the edge 120A is short in the Y-direction to such an extent that the radiation of the antenna 130 is not affected thereby.

Further, the four antennas 130 being arranged at the positions where the radio waves can be radiated toward the outside (toward the +Y-direction) of each of the four substrates 120 from each of the four edges 120A thereof is not limited to the case where the radio waves radiated from the four antennas 130 propagate in a direction parallel to the +Y-direction. In other words, the four antennas 130 being arranged at the positions where the radio waves can be radiated toward the outside (toward the +Y-direction) of each of the four substrates 120 from each of the four edges 120A thereof refers to a state in which the radio waves need only be radiated beyond each of the four edges 120A, and includes a case where the radio waves are radiated in a direction at a certain angle with respect to the +Y-direction (a direction oblique to the +Y-direction) in the XY-plane or the YZ-plane.

Because four substrates 120 are provided, the array antenna module 100 as a whole has a total of sixteen antennas 130 arranged in a four-by-four array (4×4 array) having four antennas 130 arranged in the X-direction and four antennas 130 arranged in the Y-direction.

In general, a pitch between adjacent antennas in an array antenna is set less than or equal to one-half of one wavelength of the radio waves in free space at an operating frequency, from a viewpoint of preventing unwanted radiation, such as interference waves or the like. However, the operating frequency of the antennas 130 is 300 GHZ, for example, and a wavelength A of the radio waves in free space is approximately 1 mm. When the wavelength λ is short as described above, it is difficult to manufacture the antennas 130 and to reduce the size of the PAs 140.

From this viewpoint, a pitch P1 of the antennas 130 illustrated in FIG. 1 in the X-direction is set less than the wavelength λ (one wavelength), in order to prevent the unwanted radiation, such as the interference waves or the like. Although the antennas 130 are not illustrated in FIG. 3, the pitch P1 is illustrated. The pitch P1 is an interval between centers in the X-direction of the antennas 130 that are adjacent to each other in the X-direction.

Because the antennas 130 are arranged to overlap each other in the Z-direction, a pitch P2 of the antennas 130 illustrated in FIG. 3 in the Z-direction is set less than the wavelength λ (one wavelength), similar to the pitch P1, in order to prevent the unwanted radiation, such as the interference waves or the like, between the antennas 130 that are adjacent to each other in the Z-direction.

The pitch P2 is an interval between centers in the Z-direction of the antennas 130 that are adjacent to each other in the Z-direction via the heat sink 111, the substrate 120, the PA 140, and the adhesive layer 145 interposed therebetween. The pitch P2 is equal to an interval between the upper surfaces of the substrates 120 that are adjacent to each other in the Z-direction via the heat sink 111, the PA 140, and the adhesive layer 145 interposed therebetween. The pitch P2 can be adjusted by adjusting a total height of the heat sink 111 and the wall 112.

As illustrated in FIG. 2 on an enlarged scale, a leftmost antenna 130 has two antenna elements 131 and 132. The antenna element 131 is formed on the lower surface of the substrate 120, and has a mirror image of an upside down L-shape in the plan view. The antenna element 132 is formed on the upper surface of the substrate 120, and has an upside down L-shape in the plan view. The antenna elements 131 and 132 are arranged to overlap each other so as to form the T-shape in the plan view.

The antenna elements 131 and 132 are connected by an element joint (or a connection) 133 that may be composed of a via or the like penetrating the substrate 120 in the Z-direction. FIG. 2 schematically illustrates the element joint 133. The antenna elements 131 and 132 are arranged to overlap each other so as to form the T-shape in the plan view, and the element joint 133 is connected to the PA 140. The element joint 133 of the antenna 130 is a feed point to which a signal amplified in the PA 140 is fed. The antenna 130 is a dipole antenna, for example, but is not limited to the dipole antenna as long as the antenna can radiate the radio waves from the edge 120A toward the outside (+Y-direction side) of each of the four substrates 120.

The antenna 130 may be a Yagi-Uda antenna, a substrate-integrated-waveguide (SIW) antenna, a Vivaldi antenna, a tapered slot antenna, or the like.

As illustrated in FIG. 3, there actually are four substrates 120 provided with the antennas 130, and each substrate 120 is provided with four antennas 130 as illustrated in FIG. 2, for example. One waveguide 150 is provided with respect to the four antennas 130 of each substrate 120, and one phase shifter 160 is provided with respect to each waveguide 150. For this reason, by adjusting phases of the radio waves radiated from the sixteen antennas 130 arranged in the 4×4 array of four antennas 130 arranged in the X-direction and four antennas 130 arranged in the Y-direction by the four phase shifters 160 arranged in the Z-direction, an angle of a beam formed by the radio waves radiated from the sixteen antennas 130 can be controlled in the YZ-plane.

For example, one phase shifter 160 may be provided at each of the four end portions 152 of each waveguide 150. In this case, the array antenna module 100 includes four waveguides 150 and sixteen phase shifters 160, and the angle of the beam formed by the radio waves radiated from the sixteen antennas 130 can be scanned in the XY-plane and in the YZ-plane.

At least one antenna 130 may be provided on each substrate 120. For example, in the case where four substrates 120 are provided, the array antenna module 100 may include a total of four antennas 130 arranged in a 1×4 array of one antenna 130 arranged in the X-direction and four antennas 130 arranged in the Y-direction. By using four antennas 130 arranged in the 1×4 array of one antenna 130 arranged in the X-direction and four antennas 130 arranged in the Y-direction, the beam formed by the radio waves radiated from the four antennas 130 can be scanned so as to form an angle with respect to the +Y-direction in the YZ-plane.

<PA 140>

The PA 140 is mounted on each substrate 120 by being connected to terminals on the upper surface of each substrate 120 via the BGA 141. A lower surface of the PA 140 is an example of a first surface mounted on the substrate 120, and an upper surface of the PA 140 is an example of a second surface.

As illustrated in FIG. 2 as an example, four PAs 140 are provided on each substrate 120. The array antenna module 100 radiates radio waves of 300 GHz, for example, among terahertz waves, and thus, it is desirable that the PAs 140 have a high output in order to secure a communication range. From this viewpoint, the PA 140 may be an amplifier using a compound semiconductor, such as gallium nitride (GaN), indium phosphide (InP), or the like, for example.

The PA 140 is bonded to the lower surface of the heat sink 111 located on the upper side via the adhesive layer 145 formed therebetween. Because the adhesive layer 145 has a thermal conductivity, heat generated from the PA 140 can be released from the adhesive layer 145 to the heat sink 111. Further, although there is a path on the lower side of the PA 140, connected to the heat sink 111 from the BGA 141 via the substrate 120, this path does not serve well as a heat dissipation path due to reasons such as a large heat resistance of the BGA 141 or the like. For this reason, the path connecting the upper surface of the PA 140 to the heat sink 111 via the adhesive layer 145 has a low heat resistance, and is effective as a heat dissipation structure for efficiently dissipating the heat generated from the PA 140 which is required to produce a high output. The heat dissipation structure of the array antenna module 100 is implemented by the path in which the PA 140 is connected to the heat sink 111 via the adhesive layer 145 having the thermal conductivity, and thus, it is possible to achieve a high heat dissipation efficiency.

<Adhesive Layer 145>

The adhesive layer 145 bonds the upper surface of each PA 140 to the lower surface of the heat sink 111 located above each PA 140. The adhesive layer 145 can be formed by coating a thermally conductive adhesive, including a thermally conductive filler, between the upper surface of the PA 140 and the lower surface of the heat sink 111.

<Waveguide 150>

The waveguides 150 are arranged in four stages in the Z-direction in correspondence with the four layers of the substrates 120 (that is, four substrates 120) arranged in the Z-direction. The four waveguides 150 have the same configuration. The waveguide 150 illustrated in FIG. 2 is the waveguide 150 of the fourth stage connected to the interconnect 121 of the substrate 120 of the fourth layer.

The waveguide 150 has one end portion 151, and four end portions 152, for example. The end portion 151 is a portion to which the radio waves are input, and is connected to a transmitter (not illustrated) that outputs radio waves to be transmitted. The waveguide 150 is branched twice from the end portion 151 toward the end portions 152, and thus, extends to the four end portions 152. The waveguide 150 is branched at one point for the first time, and is branched at two points for the second time. The number of end portions 152 may be set according to the number of the antennas 130 provided on one substrate 120.

The waveguide 150 can be implemented by a metal rectangular waveguide, a substrate-integrated-waveguide (SIW) mounted on a substrate, or the like.

<Phase Shifter 160>

One phase shifter 160 is provided with respect to each of the four waveguides 150, for example. For this reason, the array antenna module 100 includes four waveguides 150 and four phase shifters 160.

The phase shifter 160 is provided between the end portion 151 of the waveguide 150 and the first branching point, for example. A phase shifter capable of advancing or delaying the phase of the radio waves input from the end portion 151 may be used, for example, may be used for the phase shifter 160. As described above, one phase shifter 160 may be provided at each of the four end portions 152 of each waveguide 150, and the angle of the beam formed by the radio waves radiated from the sixteen antennas 130 may be scanned in the XY-plane and in the YZ-plane.

<Advantageous Features>

The array antenna module 100 includes a housing 110 including a plurality of layers of heat sinks 111, and a wall 112 configured to hold the plurality of layers of heat sinks 111; a plurality of substrates 120 provided between the plurality of layers of heat sinks 111, each substrate 120 of the plurality of substrates 120 having an edge 120A; a plurality of antennas 130 configuring an array antenna, at least one antenna 130 of the plurality of antennas 130 being provided on each substrate 120 of the plurality of substrates 120, the plurality of antennas 130 being arranged at positions where radio waves are radiated from a plurality of edges 120A of the plurality of substrates 120 toward an outer side of the plurality of substrates 120; and a plurality of PAs 140 provided on each substrate 120 of the plurality of substrates 120 and electrically connected to the plurality of antennas 130, each PA 140 of the plurality of PAs 140 having a first surface (lower surface) provided on one substrate 120 of the plurality of substrates 120 and a second surface (upper surface) opposite to the first surface and connected to one layer of heat sink 111 of the plurality of layers of heat sinks 111. Hence, a heat dissipation structure capable of dissipating heat from the second surface (upper surface) of the PA 140 through the heat sink 111 can be obtained.

Accordingly, the array antenna module 100 having the heat dissipation structure capable of dissipating the heat generated from the amplifier (PA 140) can be provided. Further, multi-tier integration can be achieved by laminating a plurality of substrates 120.

In addition, a plurality of antennas 130 and a plurality of PAs 140 may be provided on each substrate 120, and the plurality of antennas 130 may be arranged along the edge 120A on each substrate 120. Because the plurality of antennas 130 are arranged linearly (one-dimensionally) along the edge 120A, it is easy to reduce the pitch between the adjacent antennas 130 compared to a case where the plurality of antennas 130 are arranged two-dimensionally, for example. Hence, when transmitting the terahertz waves as the radio waves, the pitch of the plurality of antennas 130 can be reduced according to the operating frequency of 100 GHz or higher. Accordingly, it is possible to provide the array antenna module 100 capable of achieving both the multi-tier integration by laminating the plurality of substrates 120 and a narrow pitch of the antennas 130.

The housing 110 may include the partition wall 113 provided between the adjacent heat sinks 111 and partitioning the plurality of PAs 140 provided on each substrate 120. The isolation between the adjacent PAs 140 can be ensured by the provision of the partition wall 113.

The substrate 120 may include the metal layer 124 provided on the surface on the side where the partition wall 113 is located, and the partition wall 113 may be connected to the metal layer 124. In this case, it is possible to ensure a stronger isolation between the adjacent PAs 140.

In addition, the adhesive layer 145 may be provided between the second surface and the heat sink 111. The adhesive layer 145 can more reliably fix the PA 140 to the heat sink 111, and can achieve a configuration in which the heat generated from the PA 140 is easily transferred to the heat sink 111.

Moreover, the adhesive layer 145 may be formed of an adhesive including a thermally conductive filler. In this case, a configuration in which the heat generated from the PA 140 can be more reliably transferred to the heat sink 111 can be achieved.

The heat sink 111 may be formed of any one of silicon carbide (Sic), silicon nitride (SiN), aluminum nitride (AlN), silicon (Si), and metals. Alternatively, the heat sink 111 may have a laminated structure in which a plurality of layers formed of a plurality of materials selected from silicon carbide (SiC), silicon nitride (SiN), aluminum nitride (AlN), silicon (Si), and metals are laminated. In such cases, it is possible provide a heat radiation structure capable of efficiently radiating the heat generated from the PA 140.

The pitch of the plurality of antennas 130 provided on each substrate 120 may be shorter than one wavelength of the radio waves at the operating frequency of the antennas 130. In this case, unwanted radiation, such as an interference waves or the like, can be prevented, and the pitch of the antennas 130 can be reduced.

Although the array antenna module according to the embodiments of the present disclosure are described above, the present disclosure is not limited to the specifically disclosed embodiments, and various variations and modifications can be made without departing from the scope of the present disclosure.

According one aspect of the present disclosure, it is possible to provide an array antenna module having a heat radiation structure capable of radiating heat generated by an amplifier.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An array antenna module comprising:

a housing including a plurality of layers of heat sinks, and a holder configured to hold the plurality of layers of heat sinks;

a plurality of substrates provided between the plurality of layers of heat sinks, each substrate of the plurality of substrates having an edge;

a plurality of antennas configuring an array antenna, at least one antenna of the plurality of antennas being provided on each substrate of the plurality of substrates, the plurality of antennas being arranged at positions where radio waves are radiated from a plurality of edges of the plurality of substrates toward an outer side of the plurality of substrates; and a plurality of amplifiers provided on each substrate of the plurality of substrates and electrically connected to the plurality of antennas, each amplifier of the plurality of amplifiers having a first surface provided on one substrate of the plurality of substrates and a second surface opposite to the first surface and connected to one layer of heat sink of the plurality of layers of heat sinks.

2. The array antenna module as claimed in claim 1, wherein:

the plurality of the antennas and the plurality of the amplifiers are provided on each substrate of the plurality of substrates, and the plurality of antennas are arranged along the edge of each substrate of the plurality of substrates.

3. The array antenna module as claimed in claim 2, wherein the housing includes a partition wall provided between the plurality of layers of heat sinks and configured to partition the plurality of amplifiers provided on each substrate of the plurality of substrates.

4. The array antenna module as claimed in claim 3, wherein:

each substrate of the plurality of substrates includes a metal layer provided on a surface thereof having the partition wall, and the partition wall is connected to the metal layer.

5. The array antenna module as claimed in claim 2, wherein a pitch of the plurality of antennas provided on each substrate of the plurality of substrates is shorter than one wavelength of the radio waves at an operating frequency of the plurality of antennas.

6. The array antenna module as claimed in claim 1, further comprising:

an adhesive layer provided between the second surface and the one layer of heat sink of the plurality of layers of heat sinks.

7. The array antenna module as claimed in claim 6, wherein the adhesive layer is formed of an adhesive including a thermally conductive filler.

8. The array antenna module as claimed in claim 1, wherein:

the plurality of layers of heat sinks form a laminated structure including a plurality of laminated layers, and each layer of the plurality of laminated layers is formed of at least one material selected from a group consisting of silicon carbide (Sic), silicon nitride (SiN), aluminum nitride (AN), silicon (Si), and metals.

9. The array antenna module as claimed in claim 1, wherein:

the plurality of layers of heat sinks form a laminated structure including a plurality of laminated layers, and each layer of the plurality of laminated layers is formed of a plurality of materials selected from a group consisting of silicon carbide (SiC), silicon nitride (SiN), aluminum nitride (AlN), silicon (Si), and metals.

* * * * *